April 23, 1929.  J. H. KESSLER  1,710,628
BRAKE FOR AEROPLANES
Filed March 13, 1928
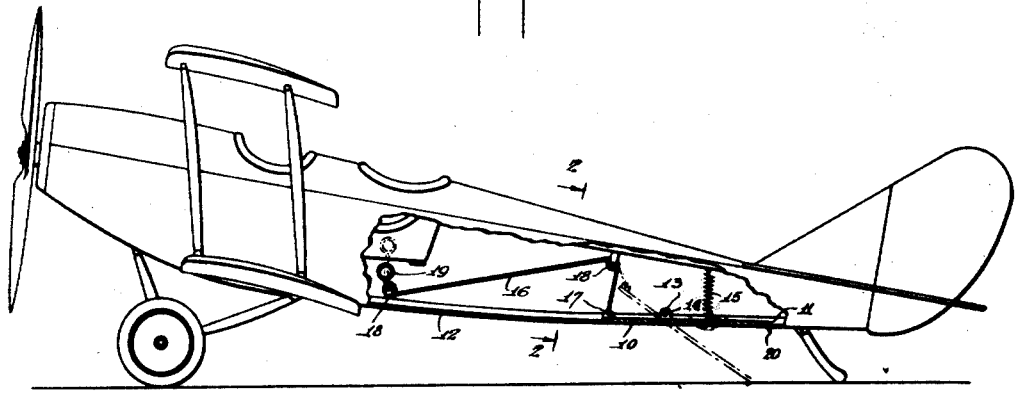
INVENTOR
John H. Kessler
BY
ATTORNEY Patented Apr. 23, 1929.

1,710,628

UNITED STATES PATENT OFFICE.

JOHN H. KESSLER, OF NYACK, NEW YORK.

BRAKE FOR AEROPLANES.

Application filed March 13, 1928. Serial No. 261,385.

My invention relates to aeroplanes, and more particularly to a brake adapted to function in the landing of the aeroplane.

The general object of my invention is to provide a drag brake normally affording no projection beyond the surface of the fuselage, but having means to throw the brake to a position to cause it to engage the ground and offer resistance to the forward movement of the aeroplane.

The nature of my invention and its distinguishing features and advantages will clearly appear as the description proceeds.

Reference is to be had to the accompanying drawings forming part of this specification, it being understood that the drawings merely illustrate one example of the invention.

Fig. 1 is a view partly in vertical section and partly in side elevation of an aeroplane equipped with my improved drag brake;

Figure 2 is an enlarged transverse section as indicated by the line 2—2 of Figure 1.

In carrying out my invention in accordance with the illustrated example, a brake element 10 is provided of broad surface and may be made of wood, metal or other suitable material. Said brake element 10 is disposed in an opening 11 in the bottom of the fuselage 12 of the aeroplane and normally lies flush with or within the plane of the lower surface of the fuselage.

The brake element 10 is pivoted to the fuselage 12 by a transverse pivot rod 13 passing through ears 14 on element 10. Spring means is provided so arranged as to normally tend to maintain the brake element 10 in inoperative position. In the illustrated example a spring 15 is provided functioning to exert a lifting action on the brake element 10 after the same has been moved to working position.

Suitable means is provided to raise the front end of the element 10 and depress the rear end so that the rear edge of said element will drag on the ground.

In the illustrated form a pull cord or cable 16 is connected at one end, as at 17, to the front end of the brake element 10 and runs over suitable sheaves 18 or equivalent guide means, the forward end of the cord or pulley having a ring 19 or other means adapted to be grasped by anyone in the aeroplane to operate the brake.

With the described construction, in landing, when the aeroplane is close to the ground, a pull on the cord or cable 16 will lift the front end of the brake element 10 and depress the rear edge thereof into engagement with the ground, the operative position of the brake being indicated in dot-and-dash lines in Figure 1. In the movement of the brake 10 to the operative position the spring 15 will be stressed and the reaction of the spring will lift the rear end of the brake element 10 and dispose said element to the full-line position of Figure 1.

Teeth 20 or equivalent sharp elements may be provided, if desired, on the rear edge of the element 10 to dig into and positively engage the ground.

I would state furthermore that while the illustrated example constitutes a practical embodiment of the invention, I do not limit myself strictly to the exact details herein illustrated, since, manifestly, the same can be considerably varied without departure from the spirit of the invention as defined in the appended claims.

I claim:

1. In an aeroplane, a brake element disposed at the under side of the fuselage of the aeroplane and forming part of the fuselage and being pivotally mounted to rock vertically to a raised position clear of the ground in landing, or to a position with the lower edge so disposed as to exert a dragging action on the ground in landing.

2. In an aeroplane, a fuselage having an opening at the under side thereof, a broad element adapted to be accommodated in said opening and to substantially close the same, means to pivotally mount a brake element to rock vertically, means to tilt said brake element to a position with its rear edge projecting below the fuselage a distance for the said element to drag on the ground and retard the forward movement of the aeroplane, and spring means to restore the brake element to the inoperative position.

3. In an aeroplane, a brake element disposed at the underside of the fuselage of the aeroplane and forming part of the fuselage and being pivotally mounted to rock vertically to a raised position clear of the ground in landing, or to a position with the lower edge so disposed as to exert a dragging action on the ground in landing; together with means to tilt said aeroplane to the braking position, and means to restore said brake to the inoperative position.

Signed at New York, in the county of New York and State of New York, this 12th day of March, A. D. 1928.

JOHN H. KESSLER.